Sept. 9, 1958          F. M. FRAGA          2,850,955
HITCH FOR LIFT-TYPE IMPLEMENTS
Filed Nov. 21, 1952          3 Sheets-Sheet 1
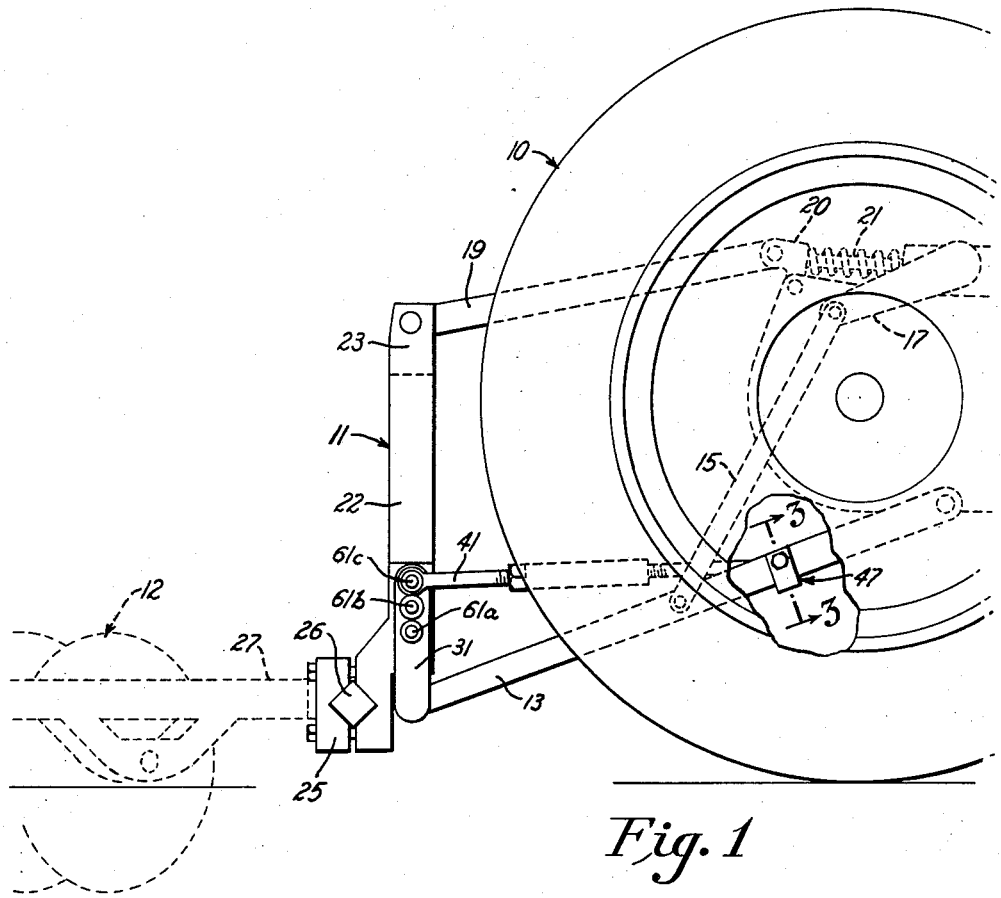
*Fig. 1*
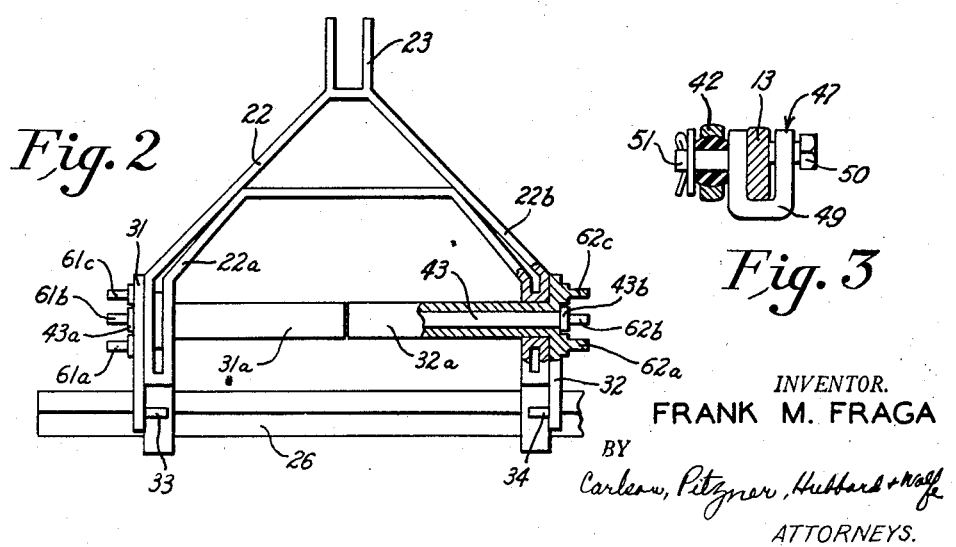
*Fig. 2*
*Fig. 3*
INVENTOR.
FRANK M. FRAGA
BY
Carlsen, Pitzner, Hubbard + Wolfe
ATTORNEYS.

INVENTOR.
FRANK M. FRAGA

Sept. 9, 1958 F. M. FRAGA 2,850,955
HITCH FOR LIFT-TYPE IMPLEMENTS
Filed Nov. 21, 1952 3 Sheets-Sheet 3

Tractor straight ahead.

Skewing of implement frame when tractor turns to left.

Skewing of implement frame when tractor turns to right.

INVENTOR.
FRANK M. FRAGA
BY
Carlson, Pitzner, Hubbard + Wolf
ATTORNEYS.

United States Patent Office 2,850,955
Patented Sept. 9, 1958

2,850,955

HITCH FOR LIFT-TYPE IMPLEMENTS

Frank M. Fraga, Fresno, Calif.

Application November 21, 1952, Serial No. 321,870

6 Claims. (Cl. 97—47.66)

The present invention relates to tractor hitches, and more particularly to a hitch for use with a pair of laterally swingable draft links.

It is an object of the present invention to provide an improved hitch mechanism for attachment to a tractor having a pair of laterally spaced and horizontally swingable draft links. It is a more specific object to provide a hitch mechanism which produces skewing movement of the tool bar and connected implement in response to the lateral swinging movement of the draft links when the tractor turns to the right or left. It is another object to provide a hitch mechanism which causes the implement to skew horizontally with respect to the trailing ends of the draft links, thereby causing the implement to articulate or steer relative to the tractor through a relatively wide angle and thereby causing the implement to track more closely behind the rear wheels of the tractor.

It is a further object of the invention to provide a novel hitch in which the effective center of pivoting of the implement about the tractor may be shifted from the region of the front wheels to the region of the rear wheels, the amount of shift depending upon the type of implement and the degree of articulation required. It is a related object to provide a hitch in which the center of pivoting, and therefore the amount of steering effect of the implement may be varied simply and quickly. It is also an object related to the above to provide a novel hitch mechanism in which the side draft forces of the implement may be applied primarily to the rear wheels of the tractor with minimum effect on manual steering.

It is an object of the invention in one of its aspects to provide a hitch having a sufficiently high point of pull as to maintain proper earth penetration of certain types of implements, but which is capable of lifting the implement clear of the ground for transport. It is a further object to provide a novel hitch in which the point of pull on the implement is so located with respect to the draft linkage as to increase the response of the automatic lift mechanism on the tractor.

Finally, it is an object to provide a hitch mechanism which is sturdy in construction and stable in use, and which may be economically manufactured and easily attached to the tractor draft links.

Other objects and advantages will be apparent upon reading the attached detailed description and upon reference to the drawings, in which:

Figure 1 is a side view in elevation of the improved hitch mechanism showing the manner in which the mechanism is connected to the tractor and attached implement.

Fig. 2 is a front end elevation of the A-frame assembly of the hitch mechanism of Fig. 1, partly in section.

Fig. 3 is an enlarged fragmentary section taken along the line 3—3 in Fig. 1.

Figure 4:
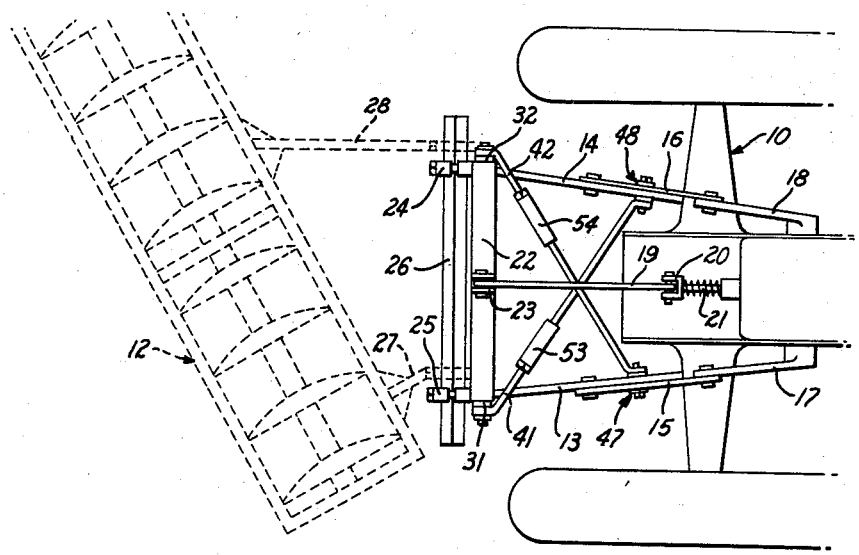
Fig. 4 is a plan view showing the preferred form of the present invention.

While the invention is susceptible of various modifications and alternative constructions, there is shown in the drawings and will herein be described in detail the preferred embodiment and alternative embodiment, but it is to be understood that it is not to be intended to limit the invention to the forms disclosed but it is intended to cover all modifications and alternative constructions falling within the spirit and scope of the invention as expressed in the appended claims.

Referring now to Fig. 1 of the drawings, the tractor, only the rear portion of which is shown, is indicated at 10, the hitch mechanism at 11, and the connected implement at 12. The tractor will be recognized as employing the well-known Ferguson System which is described in detail in Ferguson Patent 2,118,180. Connected at the rear end of the tractor under the rear axle are a pair of horizontally spaced, laterally swingable draft links 13, 14. In accordance with the teachings of Ferguson Patent 1,916,945, the links are arranged convergently, having an effective center of pivoting lying in the region of the front axle. The draft links 13, 14 are supported by drop links 15, 16, respectively, which are connected to lift arms 17, 18.

At the top of the rear axle housing is a top link or compression link 19 which is connected at its forward end to a shackle 20 which, in turn, presses upon a control rod 21. In accordance with the teachings of Ferguson Patent 2,118,180, hydraulic means are provided internally of the tractor to support the draft links 13, 14 and the connected implement at an elevation determined by the force exerted upon the top link 19, thereby to accomplish control of implement depth.

The hitch mechanism 11 serves the purpose of transmitting draft force from the implement to the top link 19, and, in addition, produces skewing of the implement relative to the trailing ends of the draft links, as set forth more fully below. In the present instance the hitch mechanism includes an A-frame 22. At the top of the A-frame a pivot 23 is provided for connection to the top link 19 of the tractor. At the bottom of the A-frame a pair of brackets 24, 25 serve to hold a tool bar 26. The implement 12 is connected to the tool bar by any desired means such as arms 27, 28. Thus, the implement 12 and A-frame constitute a rigid unit for transmitting the force of ground reaction to the top link.

In accordance with the present invention the frame 22 is provided with a pair of crank members 31, 32 which are pivoted at opposite sides of the frame and which extend vertically for fore and aft rocking movement about a common axis. The lower ends of the crank members 31, 32 are provided with draft pins 33, 34 for engaging the trailing ends of the draft links. Further, in accordance with the invention, auxiliary force-transmitting members or links 41, 42 are connected to the opposite or upper ends of the crank members 31, 32. The forward ends of the auxiliary links 41, 42 are anchored with respect to the tractor at points which are laterally offset with respect to their rear ends respectively. As a result of such offset, the rear ends of the auxiliary links move respectively forward and backward with respect to the trailing ends of the tractor draft links whenever the draft links swing laterally. This relative movement is equal and opposite at the two sides of the frame 22. As a consequence, the frame is drawn forwardly toward the tractor at one side and pushed rearwardly away from the tractor at the other side. This produces horizontal skewing of the frame 22 and the connected implement when the tractor draft links swing to the left or to the right, as occurs, for example, when the tractor is required to make relatively sharp turns.

Turning now to the specific construction of the A-frame and the mounting of the crank members, it will be noted in Fig. 2 that the legs of the A-frame, 22a and 22b, respectively, include alined apertures. The crank members 31, 32, are pivoted in these apertures on integral sleeves 31a, 32a, respectively. Telescoped within the sleeves is a cross shaft 43. This cross shaft is provided with collars 43a, 43b, which hold the sleeves end-to-end and maintain the crank members 31, 32 securely pivoted in the frame.

In the preferred form of the invention illustrated in Fig. 4, the auxiliary links 41, 42 are arranged across one another in X formation. The forward ends thereof are anchored with respect to the tractor by connecting them to the forward portions of the oppositely located draft links. Anchoring is accomplished by a pair of clamps 47, 48, the clamp 47, for example, being set forth in detail in Fig. 3. Here it will be noted that the clamp includes a U-shaped portion 49 having a set screw 50. Integral with the clamp is a pin 51 which engages a hole formed in the forward end of the auxiliary link 42. The clamps 47, 48 are positioned so that said links 41, 42 will clear the rear axle housing when the draft links swing from one side or the other incident to making a turn. The auxiliary links 41, 42 are preferably so adjusted that the crank members 31, 32 extend in a generally vertical direction under normal running conditions. This adjustment is, in the present instance, provided by a pair of turnbuckles 53, 54. One condition of adjustment is shown in Figs. 1–4.

Further in accordance with the invention, means are provided by varying the degree of skewing of the tool bar and connected implement. Such variation is accomplished in the present instance by providing a series of pins for connection of the rear ends of the auxiliary links 41, 42. These pins are indicated at 61a, 61b, 61c, and 62a, 62b, 62c, respectively. The pins are spaced along the crank member at successive distances from the point of connection of the lower draft link and used in pairs. Maximum skewing or steering effect is obtained by employing the pins 61a, 62a, which are located rather close to the trailing ends of the draft links. Minimum steering effect is achieved by connecting the auxiliary links to the pins 61c, 62c.

Prior to a discussion of the steering features of the present device, reference may be made to an additional advantageous feature, namely, the high point of connection of the implement relative to the lower draft links. As shown in the drawings, the trailing ends of the draft links 13, 14 lie substantially below the effective line of connection of the implement. Referring to Figs. 1 and 2 the crank members 31, 32 both occupy a vertical position during normal straight driving and form a more or less rigid unit with the tractor. The implement and A-frame are thus connected to the tractor along a high line of draft at the level of the cross shaft 43, and any rocking movement of the implement and A-frame in a fore and aft direction must take place about the shaft 43. Since the shaft 43, because of its elevation, is located nearer to the top link than is the case in more conventional hitches, the mechanical advantage of the implement relative to the top link is increased. That is to say, a given amount of ground reaction on the implement causes a compressive force to exist in the top link which is greater than that achieved with more conventional A-frame arrangements. This tends to counteract the tail-heaviness of the type of implement shown and enables ground reaction to develop sufficient force in the top link to cause the automatic draft control system within the tractor to function in the normal manner, thereby to control the depth of the implement.

The relatively high point of draft connection has the further advantage that raising the draft links 13, 14 causes the implement to be swung upwardly well clear of normal ground obstructions. This feature is particularly useful for transport.

Figure 5:
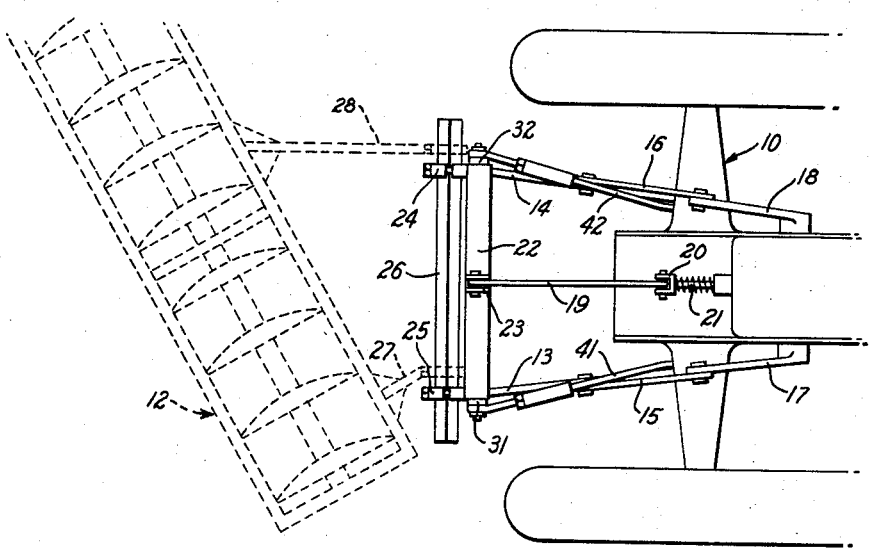
Fig. 5 is a plan view similar to Fig. 4 but showing an alternative arrangement.

If it is desired to employ the elevated hitch connection without automatic steering effect, then the arrangement shown in Fig. 5 may be used. In this figure, it will be noted, the auxiliary links 41, 42 are not arranged in X formation, but are, on the contrary, arranged generally parallel to the draft links with which they are associated. Although not shown in detail, it will be understood that the forward ends of the auxiliary links 41, 42 are connected to the forward ends of the draft links by means of clamps similar to those shown in Fig. 3. In Fig. 5 similar elements are indicated using the same reference numerals as employed in Fig. 4.

Figure 6:
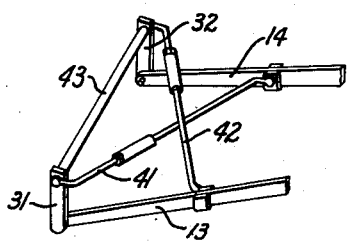
Fig. 6 is a diagrammatic perspective view showing the position occupied by the hitch mechanism under conditions of straight pull.
Figure 7:
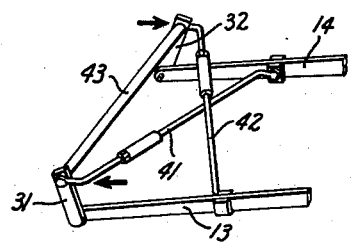
Fig. 7 is similar to Fig. 6 but shows the movement of the mechanism as the tractor turns to the left.
Figure 8:
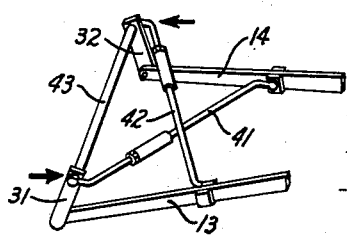
Fig. 8 is also similar to Fig. 6, but shows the movement of the mechanism when the tractor turns to the right.

While the operation of the preferred form of hitch mechanism shown in Figs. 1 to 4, inclusive, will be apparent from the foregoing, it will be helpful to summarize it briefly. The operation can be readily visualized by reference to Figs. 6, 7, and 8, which show three conditions of operation. In Fig. 6 the mechanism is shown for conditions of normal driving, with the tractor pointed straight ahead. Fig. 7 illustrates the horizontal skewing which takes place when the tractor turns to the left. Fig. 8 shows the horizontal skewing which results when the tractor turns to the right.

Under normal driving conditions the draft links occupy symmetrical positions with respect to the tractor, and the auxiliary links 41, 42 are also symmetrically arranged. Under such conditions, the crank members 31, 32 are more or less vertical, as shown.

When the tractor turns to the left, the implement tends to proceed in its initial direction. This causes lateral jackknifing movement of the draft links relative to the tractor, the draft links swinging to the left. If the turn is relatively sharp, the links will normally swing to the left until further movement is prevented by stops. Using conventional hitch arrangements, the implement must be dragged sideways through the ground. The implement not only tends to "cut the corner" but produces a furrow which is excessively wide. In using the present invention this is largely overcome, and the implement tends to track much more closely behind the rear wheels of the tractor. More specifically, the swing of the draft links to the left is accompanied by rearward movement of the auxiliary link 41 relative to the draft link 13. This is caused by the reduction in the diagonal distance between the point of attachment of the auxiliary link 41 and the trailing end of the draft link 13 which occurs during such swing. Conversely, the force-transmitting member 42 tends to pull forwardly relative to the trailing end of the draft link 14. This causes the crank members 31, 32 to rotate in opposite directions and causes the A-frame, tool bar and implement to be skewed horizontally relative to the tractor and relative to the trailing ends of the tractor draft links. For simplicity the A-frame, tool bar and implement have been omitted in Figs. 6 to 8. The direction of skewing is, however, clearly indicated by the position of the cross shaft 43 about which rotation of the crank members takes place.

The effect of the horizontal skewing shown in Fig. 7 is to enable the implement to assume a much sharper angle relative to the tractor during turning than would otherwise be possible. While some articulation of the implement relative to the tractor occurs even in conventional arrangements by reason of the lateral swing of the draft links, the effect of the vertically arranged crank members 31, 32 and the associated linkages is to greatly increase the degree of articulation. This produces a pronounced "steering effect" and reduces the tendency of the implement to be forced sideways through the earth when the tractor makes a turn. Using the present arrangement the implement can be caused to turn through a sharp angle without substantially changing the width of the furrow and without placing any undue side thrust upon the tractor.

Figure 9:
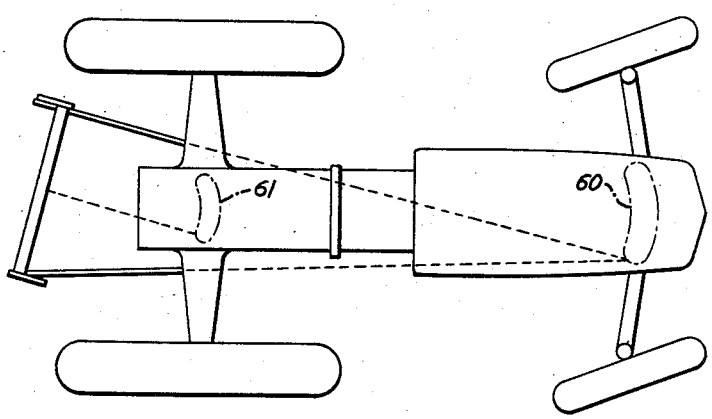
Fig. 9 is a diagram showing the shift of the effective center of pivoting from the region of the front wheels of the tractor to the region of the rear wheels brought about by the present invention.

One of the effects of the skewing is to shift the center of pivoting of the implement from the region of the front wheels to the region of the rear wheels. This is shown in Fig. 9, which is a diagrammatic plan view of a tractor and connected linkage. Under normal conditions the implement tends to pivot about a region which lies at the point of convergence of the draft links. This region is indicated at 60. Because of the horizontal skewing effect obtained when using my improved mechanism, the implement, instead, tends to pivot about a region 61. As shown, this region 61 may be alined with the rear wheels of the tractor. It will be appreciated by one skilled in this art that when the latter condition is obtained the side draft of the implement tends to be applied to the rear wheels, rather than the front wheels. The practical effect of this is to minimize the effect of side draft upon the steering of the tractor. Thus, implements with a substantial amount of side draft may be successfully steered under all normal field conditions and the tractor may be driven for longer periods without operator fatigue.

For various types of implements having a lesser degree of side draft and which permit a closer coupling to the tool bar, it may be desirable to reduce the steering effect or amount of articulation between implement and tractor. This is accomplished by employing the pins 61b, 62b, or 61c, 62c, respectively. Under such conditions, the effective center of pivoting of the implement occupies a position intermediate the regions 60, 61 shown in Fig. 9.

It is one of the features of the present invention that the opposite skewing movement takes place when the tractor turns to the right, as illustrated in Fig. 8. Turning the tractor to the right causes relative swinging movement of the draft links 13, 14 to the right. This causes the auxiliary link 42 to rotate the crank member 32 rearwardly, and causes the link 41 to rotate the opposite crank 31 forwardly. The direction of skewing of the A-frame, tool bar and connected implement being reversed, the implement tends to follow the tractor closely in a right turn. The effective center of pivoting of the implement is the same as that described in Fig. 9 for a turn to the left.

The crank members 31, 32 have been shown arranged vertically in the drawings in order to bring out the "steering" effect as graphically as possible. It is, however, one of the important features of the present invention that the cranks may be adjusted to "lean" forwardly under straight driving conditions. Such adjustment may be easily made by screwing up the turnbuckles 53, 54. This condition of adjustment brings about a number of important and rather unexpected advantages. It provides a combined steering and leveling effect which is particularly useful for operating wide mounted implements over fields that are uneven or which have hard spots. Spring-toothed harrows and wide gangs of furrowing shovels are typical examples of implements which I have in mind.

The operation of the hitch during such condition of adjustment and with a wide harrow attached may be understood by considering what happens under straight driving conditions. Suppose that the force applied to the implement suddenly becomes greater at the right-hand side of the implement than at the left-hand side. This is a very common occurrence and may be caused in several different ways. The right-hand side of the implement may, for example, strike a hard spot. The right rear tractor wheel may suddenly drop into a furrow or irrigation ditch. The same effect may occur by reduction of force at the left-hand end of the implement either because the left-hand tools strike a patch of loose soil or because the left rear wheel of the tractor rides upon a hillock. Regardless of the cause, the effect is that the forces on the implement are unbalanced and the implement tends to swing, in the present example, to the left relative to the tractor. The change is immediately sensed by the operator who then attempts to correct the situation by turning the steering-wheel. Under such uneven field conditions, steering a wide mounted implement is a difficult and fatiguing process.

In the present device correction occurs smoothly and automatically. When the right rear tractor wheel drops into a furrow, the unbalance of forces causes the implement to tend to swing to the left on the draft links toward the condition shown in Figs. 7 and 9. Assuming that the crank members 31, 32 are inclined forwardly, say 30 degrees or more, movement of the cross links imparts a large vertical component of movement to the ends of the implement. Thus the left-hand side of the implement is lowered and the right-hand side is raised.

The effect of this is to restore the implement to a position generally level with the ground, to relieve the excessive drag at the right-hand side while increasing the drag at the left. With forces again balanced, the implement will tend to swing back to its normal central position. In addition to this leveling adjustment, the steering effect, previously discussed, is active immediately to bring the implement back in line with the tractor. With the cranks inclined forwardly, both effects merge together to correct unbalanced forces and to keep the implement running straight. Experience has shown this to be true under the most adverse field conditions, enabling straight furrows with a great reduction in operator fatigue.

In the claims which follow, the term "generally vertically" covers crank members (such as 31, 32) which extend upwardly at an angle under straight driving conditions to obtain the above leveling effect as well as cranks which are adjusted straight up and down.

It will be understood further that the term "implement frame" used in the following claims includes both frames and supports to which an implement may be connected as well as frames which are integral with an implement.

This application is a continuation-in-part of my co-pending application Serial No. 257,774, now abandoned, which was filed November 23, 1951.

I claim as my invention:

1. In an implement-tractor linkage the combination comprising a pair of horizontally spaced and laterally swingable draft links attachable at their forward ends to the tractor, an implement frame, crank members individually pivoted at opposite sides of said frame for fore and aft rocking movement, said crank members being arranged generally vertically and having draft pins thereon for pivoting engagement with the trailing ends of the tractor draft links, and a pair of cross links coupled at their rear ends respectively to said crank members, said cross links being arranged in X formation and having means at their forward ends anchored to the forward ends of the draft links so that lateral swinging movement of the draft links relative to the tractor is accompanied by rocking of said crank members in opposite directions to produce horizontal skewing movement of the implement frame about the trailing ends of the draft links.

2. A draft hitch for use with a tractor having a pair of horizontally spaced and laterally swingable draft links trailingly pivoted thereon comprising, in combination, an implement frame, crank members individually pivoted at opposite sides of said frame and arranged generally vertically for fore and aft rocking movement, said crank members having draft pins thereon for pivoting engagement with the trailing ends of the tractor draft links, and a pair of cross links coupled at their rear ends respectively to said crank members, said cross links being arranged in X formation and having means at their forward ends for anchoring the same at the forward ends of the opposite draft links respectively so that lateral swinging movement of the draft links relative to the tractor is accompanied by rocking of said crank members in opposite directions to produce horizontal skewing of the implement frame relative to the trailing ends of the draft links.

3. A draft hitch for use with a tractor having a pair of horizontally spaced and laterally swingable draft links trailingly pivoted thereon comprising, in combination, an implement frame, crank members individually pivoted at opposite sides of said frame and arranged generally vertically for fore and aft pivoting movement about a common axis, said crank members having draft pins at the lower ends thereof for pivoting engagement with the trailing ends of the tractor draft links, and a pair of auxiliary links arranged in X formation, said auxiliary links being connected to said crank members adjacent the top ends of the latter and each extending forwardly into engagement with the forward portion of the oppositely located draft link so that lateral swinging movement of the draft links relative to the tractor upon turning the same is accompanied by rocking of the crank members in opposite directions to produce horizontal skewing movement of the implement frame about the trailing ends of the draft links.

4. A draft hitch for use with a tractor having a pair of horizontally spaced and laterally swingable draft links trailingly pivoted thereon and having a top link centered above the draft links, comprising, in combination, a transversely arranged A-frame having a tool bar at its lower end and having a pivot at its apex for connection to the top link, crank members vertically arranged on opposite sides of said A-frame and pivoted thereto on a common axis lying between said tool bar and said pivot, said crank members having draft pins at the bottom ends thereof below said common axis for pivoting engagement with the trailing ends of the tractor draft links, and a pair of auxiliary links having means at their forward ends anchoring the same to the forward portions of the draft links, said auxiliary links having means at their rear ends for connection to the upper portions of said crank members.

5. In an implement-tractor linkage, the combination comprising a pair of horizontally spaced draft links, a top link centered above the draft links, means at the forward ends of said links for attaching them to the tractor for lateral swinging movement relative thereto, a pair of crank members having draft pins for pivoting to the trailing ends of said links and extending upwardly therefrom, auxiliary links connected to the upper ends of said crank members, said auxiliary links extending forwardly and being anchored on the respective forward end portions of said draft links, and an implement frame arranged transversely of the tractor and having a tool bar at its lower end, said frame having a pivot at its upper end connected to the top link and having pivots at its opposite sides and lying on a common axis pivotally engaging the upstanding portions of said crank members.

6. A structure, as in claim 2, with means included with the cross links to adjust the length thereof whereby to alter the normal setting of the crank members relative to the perpendicular.

References Cited in the file of this patent

UNITED STATES PATENTS

| 1,916,945 | Ferguson | July 4, 1933 |
| 2,352,466 | Arps | June 27, 1944 |
| 2,530,565 | Briscoe | Nov. 21, 1950 |
| 2,619,019 | Temple | Nov. 25, 1952 |
| 2,673,509 | Wilson | Mar. 30, 1954 |
| 2,697,393 | Gardner | Dec. 21, 1954 |
| 2,711,036 | Crenshaw | June 21, 1955 |

FOREIGN PATENTS

| 549,780 | Great Britain | Dec. 7, 1942 |
| 556,793 | Great Britain | Oct. 21, 1943 |